(12) United States Patent
Smith

(10) Patent No.: US 7,079,139 B2
(45) Date of Patent: Jul. 18, 2006

(54) METHOD AND SYSTEM FOR MEASURING AN ITEM DEPICTED IN AN IMAGE

(75) Inventor: Joshua Edward Smith, Barre, MA (US)

(73) Assignee: Kaon Interactive, Inc., Maynard, MA (US)

( * ) Notice: Subject to any disclaimer, the term of this patent is extended or adjusted under 35 U.S.C. 154(b) by 422 days.

(21) Appl. No.: 10/187,507

(22) Filed: Jul. 1, 2002

(65) Prior Publication Data

US 2003/0038799 A1    Feb. 27, 2003

Related U.S. Application Data

(60) Provisional application No. 60/315,431, filed on Aug. 28, 2001, provisional application No. 60/302,574, filed on Jul. 2, 2001.

(51) Int. Cl.
*G06T 11/00*    (2006.01)

(52) U.S. Cl. ........................... 345/427; 345/642

(58) Field of Classification Search ............... 382/106, 382/201, 206, 286; 345/420, 419, 427, 642, 345/964
See application file for complete search history.

(56) References Cited

U.S. PATENT DOCUMENTS 6,045,229 A * 4/2000 Tachi et al. .................... 353/28
6,677,939 B1 * 1/2004 Uchiyama ................... 345/419

OTHER PUBLICATIONS

Zirbel et al., Using AutoCAD Release 13 for Windows', 1995, pp. 150, 790, 855-863, 1137, 1168.*

Foley et al., "Computer Graphics Principles and Practice", 1996, pp. 253-254.*
Zirbel et al., "Using AutoCAD Release 13 for Windows", 1995, pp. 1090-1091, 1138.*
Wakita et al., "XVL: A Compact And Qualified 3D Representation With Lattice Mesh and Surface for the Internet", 2000, ACM, pp. 45-51.*

* cited by examiner

*Primary Examiner*—Almis R. Jankus
(74) *Attorney, Agent, or Firm*—Law Office of Brett N. Dorny

(57) ABSTRACT

A method and system for measuring an object represented by a three dimensional model includes an algorithm for displaying the three dimensional object in a 2 dimensional space. Once rendered in two dimensions, a user can identify two points on the object in that two dimensional space and in accordance with the invention, the system can determine the distance between the two points in the three dimensional space of the object. The system and method can use a pick function to determine the coordinates of each point in three dimensional space as a function of the two dimensional coordinates of each point selected in the two dimensional display space and determine the distance between the three dimensional coordinates of each point in the three dimensional space. The system and method can also use a Z-buffered rendering algorithm for displaying the three dimensional object in a two dimensional image and determining the distance between two selected points in the two dimensional image as a function of Z value stored for each point. Alternatively, where Z-buffer information cannot be used, the system and method can project three dimensional rays through the selected points to the object and determine the depth (or distance) from the point of view of the viewer. The system and method can determine the distance between the selected points as a function of the depth information.

20 Claims, No Drawings

METHOD AND SYSTEM FOR MEASURING AN ITEM DEPICTED IN AN IMAGE

CROSS-REFERENCE TO RELATED APPLICATIONS

This application claims the benefit of priority to U.S. Ser. No. 60/315,431 filed Aug. 28, 2001, and U.S. Ser. No. 60/302,574 filed Jul. 2, 2001, which are incorporated herein by reference in their entirety.

STATEMENT REGARDING FEDERALLY SPONSORED RESEARCH

Not Applicable

REFERENCE TO MICROFICHE APPENDIX

Not Applicable

BACKGROUND OF THE INVENTION

The present invention is related to a method and system for measuring an object represented by a 3D model and, in particular, a method and system for measuring an object displayed in an image that is distributed over a network.

Many networked display devices are capable of displaying three dimensional models of objects. In recent years, eCommerce conducted via World Wide Web has increased dramatically. Sellers of goods often display their items on web pages in order to allow customers to view products via the convenient method of logging onto a particular web pages and browsing through the various items. In this way, customers can access the web pages of competitors and perform comparison shopping very quickly and efficiently. Although providing realistic models of items that may be for sale facilitates purchases, there are still additional mechanisms that could be added to the three dimensional objects in order to further facilitate sales and reduce the need to provide live telephone support in the form of an individual answering customer questions via email or the telephone.

Accordingly, one object of the present invention is to provide a customer or user with the ability to make measurements of the object being displayed. It is another object of the present invention is to provide a customer or user with the ability to make measurements of the object in three dimensions. It is a further object of the invention to enable the customer or user to obtain a more realistic perception of what the item would actually look like or if the item would fit in its intended space.

SUMMARY OF THE INVENTION

The invention is directed to a method and system for measuring an object represented by a three dimensional model includes an algorithm for displaying the three dimensional object in a 2 dimensional space. Once rendered as a two dimensional image, a user can identify two points on the object in that two dimensional space defined by the image and in accordance with the invention, the system can determine the distance between two corresponding points in the three dimensional space of the object. The coordinates or pixel locations of the points in the image (or the two dimensional space defined thereby) can be used to determine the corresponding coordinates in the three dimensional space of the object. In accordance with the invention, information relating to the third dimension or Z value of the selected points can be provided by the rendering algorithm or determined using processes such as ray tracing. The corresponding coordinates in the three dimensional space of the object can be determined as a function of the coordinates or pixel locations in two dimensional space of the image and the information relating to the third dimension or Z value. Once the coordinates of the two point in three dimensional space is determined, the distance between the points can be derived using vector mathematics and the Pythagorean theorem.

The system and method can use a pick function to determine the coordinates of each point in three dimensional space as a function of the two dimensional coordinates of each point selected in the two dimensional display space and determine the distance between the three dimensional coordinates of each point in the three dimensional space. The system and method can also use a Z-buffered rendering algorithm for displaying the three dimensional object in a two dimensional image and determining the distance between two selected points in the two dimensional image as a function of the two dimensional coordinates and Z value stored for each point.

Alternatively, where Z-buffer information is not available, the system and method can project three dimensional rays through the selected points to the screen and determine the three dimensional points at which the ray intersects the object. The system and method can then determine the distance between the selected points as the distance between the corresponding the three dimensional points.

DETAILED DESCRIPTION OF THE PREFERRED EMBODIMENTS

The method and system disclosed herein are directed toward a way of allowing a user to measure an item displayed on a networked display system. The item displayed could be any object. In some embodiments, the item could be an article placed on a web page by an entity for the purpose of selling the particular article. For example, a furniture retailer may place pieces of furniture on its web page. This retailer could enable a user accessing images of the various pieces of furniture to measure each item. In this way, a customer could readily determine if, for example, a couch she is interested in purchasing would fit in her living room.

In one embodiment, the invention can be provided through software running on a personal computer or a so called set-top box (such as a cable-TV converter) with an embedded processor. For example, the networked display system can include a computer monitor or television screen connected to the Internet. The computer monitor or television screen can obtain its connection to the Internet via a computer or similar device. The networked display system could be used to view a three dimensional object presented on a web page. Preferably, the display system can have three dimensional display capability. The image can be stored as data in memory on a server and transmitted to a user, for example at the user's request. For example, the image can be stored at a website and user accessing the website can select a product to be viewed, such as by clicking on a link in a web page; the image of the product can be transmitted to the user, for example using HTTP or some other data transmission protocol and rendered using software installed on the user's computer.

The present invention is directed to a system and method for measuring objects depicted in objects rendered using textured, high quality models. In one embodiment, a three dimensional source model, which has a very large number of polygons, can be stored in a HyperSpace format. The Hyperspace format is a format developed at Kaon Interactive, Inc. Alternatively, the three dimensional source model can be stored in a different 3D file format, such as 3DS, STL, PLY, or VRML. The three dimensional source model could be textured or could contain colors or might be just geometry. Once the number of polygons has been reduced in a preferred embodiment, the texture images or color can be combined with an artificial lighting model to make the model more realistic looking. In cases where only geometry is present in the source model, only an artificial lighting model is applied.

The system renders an image of a three dimensional object as viewed from the perspective of a virtual viewer or camera (herein referred to as the viewer) which is defined to have fixed point in three dimensional space with respect to the object. Typically, the image presented to the user is the image seen from the perspective of the viewer. Any of the three dimensional display algorithms well known in the art can be used to render the three dimensional object in a two dimensional image. These images can be generated by rendering the original high-polygon source model using a Scan-Line Shading algorithm. Alternatively, a Ray Tracing algorithm can be used to render the original high-polygon count model. These and other rendering algorithms are described in detail in James D. Foley, Andries van Dam, Steven K. Feiner, John F. Hughes, COMPUTER GRAPHICS, PRINCIPLES AND PRACTICE IN C (2d ed. 1996), the contents of which are hereby incorporated by reference. Either of these algorithms or similar rendering algorithms could be implemented in C or Java.

In one embodiment, the three dimensional display system can be capable of retaining depth information determined during the rendering process process. The depth information can be stored either as the Z coordinate of a three dimensional point, or as the distance from that point to the viewer. This depth information can be accessible by the software used to provide the measurement functions. A user can select a location on the two dimensional image corresponding to a point on the three dimensional object displayed in the image. The rendering algorithm can use the two dimensional pixel location within the three dimensional scene displayed on the user's displaying device to produce and record either a depth value, indicating how far from the viewer that point would be in three dimensional space, or the Z coordinate, or a full set of three dimensional coordinates for that point. The measuring software can determine the distance in the three dimensional space between two points selected by a user as a function of the two dimensional pixel locations and the three dimensional information recorded by the rendering process for each pixel, and therefore for the two pixels in question, in the form of either depth value, Z coordinate, or the actual three dimensional point. In one embodiment, a Z-buffered scan-line rendering algorithm is used connection with a measuring system implementing an algorithm for determining the distance between two points in a three dimensional space. In this embodiment, for each of the pixels on the screen the Z coordinate of the three dimensional point rendered at that pixel is stored in order to aid hidden surface removal and determination of the coordinates of any point in a three dimensional space. The measured distance can be determined by querying the Z value stored at a given pixel on the screen of the display system to determine the three dimensional locations of the points on the object, and then computing the distance in three dimensional space between those points.

Alternatively, where, for example, the Z buffer cannot be accessed after rendering or when the particular display system does not use a Z buffer, the depth information could be captured by tracing two 3D rays passing through the viewer location and each of the points on the projection plane of the viewer that correspond to the points on the screen selected by the user. As each ray passes through the scene it may intersect the geometry displayed in the scene in one or more three dimensional locations. For each ray, the location of the point of intersection closest to the viewer is found. Having found two three dimensional points of intersection, one for each ray, the distance between those two points is computed.

As described above, the measurement method disclosed herein is directed toward measuring three dimensional objects that are displayed on a display system. Preferably, the three dimensional object should be in a form supported by the display system. The model of the object is typically incorporated in a file that can be rendered by the display system.

In accordance with the invention, the computer facilitating a connection to the network can receive two input locations from the display system. After having received these two input locations, the computer can use the screen space associated with these locations to determine the corresponding locations of those points in three dimensional space and determine the distance between the two locations. The display system can provide a complete set of three dimensional coordinates for each point or pixel location chosen by the user. In addition, the three dimensional display system can provide a "pick" function for use by the display system to determine locations (coordinates) of points in the three dimensional space. The display system can be located at the user's local computer or a remote computer that communicates information with the user's local computer.

The three dimensional distance-vector between these pixel locations can be calculated by subtracting the two three dimensional position vectors associated with each point chosen by the user. The magnitude of this distance-vector or distance can be determined using the Pythagorean theorem as the square root of the sum of squares of the three components of the distance vector: X, Y and Z.

Distance Vector=[x, y, z]

Distance=magnitude(Distance Vector)=sqrt($x^2+y^2+z^2$)

If the display system cannot provide additional coordinates beyond the Z coordinate for a chosen pixel, the complete three dimensional location can be derived by inverting the projection equation used to transform the three dimensional locations into the two dimensional image space. For example, if the projection equation is:

Screen_X=Scale*Object_X/Object_Z

Screen_Y=Scale*Object_Y/Object_Z

Where

Screen coordinates (Screen_X, Screen_Y) are in pixels;

Object coordinates (Object_X, Object_Y, Object_Z) give 3D locations in the coordinate frame of the viewer;

Scale captures the scaling implicit in the relationship between camera field-of-view and screen size; and inputs are Screen coordinate values and Object Z which is the distance to the viewer point of view that is identical to Z value or ray trace through the view point of view described above.

Using these equations, Object_X and Object_Y coordinates can be found by substitution. In this way, the complete three dimensional coordinate can be obtained. Once the entire three dimensional coordinate is known for each point, the distance can be calculated using the Pythagorean technique described above.

In accordance with the invention, the user can be provided with access to real-time results of the measurement. For example, the user can use a mouse to click-and-drag from one pixel location on the 3D scene to a second 3D location. On the click, the first 3D location can be calculated. The user could then drag the mouse to a second location. This second 3D location could be continually re-evaluated as the user drags the mouse across the display unit. In this way, the user can view the resulting distance between these two points in real-time. The units displayed in the English system of units or the metric system of units. In one embodiment, the user might be permitted to select the system of units. The line between the two endpoints can be drawn by the display system using a combination of 2D overlay graphics atop the 3D scene. In another embodiment, the display of the line can be facilitated by the 3D display environment itself and optionally, parts of the line that lie inside the 3D model could be properly occluded. Alternatively, the 2D line showing the distance being measured can be drawn as a solid line where 3D points along that line would be in front of, or coincident with, the model and as a dotted line where 3D points along that line might appear to be behind the object.

The invention may be embodied in other specific forms without departing from the spirit or essential characteristics thereof. The present embodiments are therefore to be considered in respects as illustrative and not restrictive, the scope of the invention being indicated by the appended claims rather than by the foregoing description, and all changes which come within the meaning and range of the equivalency of the claims are therefore intended to be embraced therein.

What is claimed is:

1. A method of measuring an object rendered on a display system connected to a network, the method comprising the steps of:
    A) receiving from the network three dimensional source data representative of a model of an object in a three dimensional space;
    B) rendering an image on said display system using said three dimensional source data;
    C) identifying a first point on said display system without regard to the three dimensional source data and said image;
    D) determining a first point on the object in the three dimensional space corresponding to the first point on the display system based upon said image;
    E) identifying a second point on said display system without regard to the three dimensional source data and said image;
    F) determining a second point on the object in the three dimensional space corresponding to the second point on the display system based upon said image;
    G) determining a distance in three dimensional space between the first point on the object in the three dimensional space and the second point on the object in the three dimensional space; and
    H) displaying the value of the determined distance on said display system to the user.

2. A method of measuring an object according to claim 1 wherein the step of determining said first point on the object in three dimensional space, includes determining a coordinate of said first point on the object in three dimensional space as a function of a Z value associated with the image at the first point on the display system and the step of determining said second point on the object in three dimensional space, includes determining a coordinate of said second point on the object in three dimensional space as a function of a Z value associated with the image at the second point on the display system.

3. A method of measuring an object according to claim 1 wherein the step of determining said first point on the object in three dimensional space, includes determining a coordinate of said first point on the object in three dimensional space as a function of a ray traced through the image at the first point on the display system and the step of determining said second point on the object in three dimensional space, includes determining a coordinate of said second point on the object in three dimensional space as a function of a ray traced through the image at the second point on the display system.

4. A method of measuring an object according to claim 1 wherein the step of determining said first point on the object in three dimensional space, includes determining a coordinate of said first point on the object in three dimensional space using a pick function and coordinates of the image at the first point on the display system and the step of determining said second point on the object in three dimensional space, includes determining a coordinate of said second point on the object in three dimensional space using a pick function and coordinates of the image at the second point on the display system.

5. A method of measuring an object according to claim 1 wherein the step of determining said first point on the object in three dimensional space, includes determining a coordinate of said first point on the object in three dimensional space using an inverted projection equation and coordinates of the image at the first point on the display system and the step of determining said second point on the object in three dimensional space, includes determining a coordinate of said second point on the object in three dimensional space using an inverted projection equation and coordinates of the image at the second point on the display system.

6. A method of measuring an object according to claim 1 wherein the step of determining the distance in three dimensional space, includes determining a distance between the first point on the object in three dimensional space and the second point on the object in three dimensional space as a function of at least one vector associated with each of the first point on the object in three dimensional space and the second point on the object in three dimensional space.

7. A method of measuring an object according to claim 1 wherein the step of determining the distance in three dimensional space, includes determining a distance between the first point on the object in three dimensional space and the second point on the object in three dimensional space as a function of orthogonal coordinates associated with each of the first point on the object in three dimensional space and the second point on the object in three dimensional space.

8. A system for measuring an object rendered on a display system connected to a network comprising:
    A) an interface adapted for connecting said display system to a network and adapted for receiving from the network three dimensional source data representative of a model of an object in a three dimensional space;
    B) a rendering engine adapted for rendered an image on said display system using said three dimensional source data;
    C) a display control system for identifying a first point on said display system and for identifying a second point on said display system without regard to the three dimensional source data and the image; and D) a processing system adapted for determining a first point on the object in the three dimensional space corresponding to the first point on the display system based upon said image, adapted for determining a second point on the object in the three dimensional space corresponding to the second point on the display system based upon said image; and adapted for determining a distance in three dimensional space between the first point on the object in the three dimensional space and the second point on the object in the three dimensional space.

9. A system for measuring an object according to claim 8 wherein the processing system is adapted for determining a coordinate of said first point on the object in three dimensional space as a function of a Z value associated with the image at the first point on the display system and adapted for determining a coordinate of said second point on the object in three dimensional space as a function of a Z value associated with the image at the second point on the display system.

10. A system for measuring an object according to claim 8 wherein the processing system is adapted for determining a coordinate of said first point on the object in three dimensional space as a function of a ray traced through the image at the first point on the display system and adapted for determining a coordinate of said second point on the object in three dimensional space as a function of a ray traced through the image at the second point on the display system.

11. A system for measuring an object according to claim 8 wherein the processing system is adapted for determining a coordinate of said first point on the object in three dimensional space using a pick function and coordinates of the image at the first point on the display system and adapted for determining a coordinate of said second point on the object in three dimensional space using a pick function and coordinates of the image at the second point on the display system.

12. A system for measuring an object according to claim 8 wherein the processing system is adapted for determining a coordinate of said first point on the object in three dimensional space using an inverted projection equation and coordinates of the image at the first point on the display system and adapted for determining a coordinate of said second point on the object in three dimensional space using an inverted projection equation and coordinates of the image at the second point on the display system.

13. A system for measuring an object according to claim 8 wherein the processing system is adapted for determining a distance between the first point on the object in three dimensional space and the second point on the object in three dimensional space as a function of at least one vector associated with each of the first point on the object in three dimensional space and the second point on the object in three dimensional space.

14. A system for measuring an object according to claim 8 wherein the processing system is adapted for determining a distance between the first point on the object in three dimensional space and the second point on the object in three dimensional space as a function of orthogonal coordinates associated with each of the first point on the object in three dimensional space and the second point on the object in three dimensional space.

15. A method of measuring an object according to claim 1 wherein the network is a global computer network.

16. A method of measuring an object according to claim 1 wherein the network is a wide area computer network.

17. A system for measuring an object according to claim 8 wherein the network is a global computer network.

18. A system for measuring an object according to claim 8 wherein the network is a wide area computer network.

19. A display system connected to a computer network for rendering an image, the display system comprising:
 means for receiving from the network image data representing three dimensional data of an object;
 means for rendering and displaying a two dimensional image based upon the image data;
 means for selecting two points on a display without regard to the image data and the two dimensional image;
 means for determining a distance in three dimensional space between points on the object corresponding to the selected two points on the display and the two dimensional image; and
 means for displaying the distance.

20. The display system according to claim 19, wherein the means for determining a distance includes:
 means for determining a first point on the object in three dimensional space corresponding to a first one of the selected two points based upon the image data;
 means for determining a second point on the object in three dimensional space corresponding to a second one of the selected two points based upon the image data; and
 means for determining a distance in three dimensional space between the first point.

* * * * *